2,748,176
PURIFICATION OF DICHLOROETHANE

Herbert E. Morris, La Marque, Tex., assignor to Monsanto Chemical Company, St. Louis, Mo., a corporation of Delaware No Drawing. Application August 23, 1952,
Serial No. 306,059

4 Claims. (Cl. 260—652)

This invention relates to the purification of dichloroethane or, as it is frequently designated in the trade, ethylene dichloride. More particularly, it relates to the purification of dichloroethane containing chloroprene as an impurity.

It is well known that dichloroethane may be pyrolyzed to produce vinyl chloride. In addition to the main products of pyrolysis, vinyl chloride and hydrogen chloride, small amounts of chloroprene occur as a by-product along with a certain amount of unconverted dichloroethane. In processes for vinyl chloride production where the known reaction of acetylene and hydrogen chloride is combined with the pyrolysis reaction, the presence of vinyl acetylene in the acetylene feed also results in the formation of some chloroprene. In all of these processes, economical operation demands recycle of the unconverted dichloroethane stream to the pyrolysis step. However, chloroprene even in small concentrations in the dichloroethane feed inhibits the pyrolysis reaction cutting down conversion to vinyl chloride.

In addition to its adverse inhibitory effect, the presence of chloroprene gives rise to the formation of troublesome insoluble polymers in various parts of the equipment which result in mechanical difficulties in the process. Hence, it is evident that to achieve overall optimum efficiency, the dichloroethane for use in the manufacture of vinyl chloride must be free from chloroprene. While chloroprene can be separated from 1,2-dichloroethane by fractionation, its separation from the 1,1-dichloroethane isomer or mixtures of the two isomers by this method is impractical because of the proximity of the boiling points of the 1,1-isomer and chloroprene.

It is an object of this invention, therefore, to provide a process for the purification of dichloroethane containing chloroprene as an impurity.

It is a further object of this invention to provide a simple and economical process for effecting the removal of chloroprene from dichloroethane by selective chlorination.

Other objects and advantages of the invention will be apparent from the following description of the invention.

It has now been found that chloroprene in dichloroethane can be removed therefrom by subjecting the mixture to chloroination under conditions such that the chloroprene is converted to higher chlorinated products while the dichloroethane remains substantially unchanged. The dichloroethane may then be readily isolated.

According to the invention, chlorine gas is bubbled through the dichloroethane-chloroprene mixture and the liquid product is withdrawn and subjected to fractionation in a suitable column with the dichloroethane substantially free from chloroprene being taken overhead and the higher chlorinated products removed from the bottoms.

The following example will serve to illustrate the principle of the invention but is not to be construed as limiting its scope.

Example I

A solution of 1,2-dichloroethane containing 3% by weight of chloroprene is treated with chlorine at room temperature by bubbling chlorine through the mixture contained in an Erlenmeyer flask for five minutes. The treated solution is analyzed by means spectrometer and found to contain only about 0.1% of chloroprene by weight, representing a decrease of 97% in the chloroprene content of the solution.

The chlorinated mixture is fractionally distilled in a standard laboratory column and dichloroethane substantially free from chloroprene is separated therefrom.

Example II

Chlorine is bubbled through a solution of 1,1-dichloroethane containing approximately 10% chloroprene by weight as described in Example I. The treated solution contains less than 0.1% chloroprene. The 1,1-dichloroethane obtained upon fractionation of the mixture is essentially 100% pure.

It is obvious that various modes of applying the principle of the invention may be employed. The reaction may be carried out, for example, in conventional equipment ordinarily utilized for vapor-liquid reactions such as a countercurrent bubble-cap absorption column or packed tower. In this case, where operation would be continuous, the chlorine gas would be introduced at the bottom of the column and be bubbled upward through the descending liquid mixture of dichloroethane containing chloroprene. In batch operations, any suitable kettle-type reactor may be employed which is provided with an inlet gas distributor at the bottom for injecting the chlorine gas. The reaction proceeds smoothly and rapidly, only a few seconds contact between the chlorine and chloroprene being required to effect substantially complete reaction. The reaction is most conveniently carried out at atmospheric pressure but higher or lower pressure can be used.

The reaction is preferably carried out at room temperature and without additional heating. Higher or lower temperatures may be employed but, since the upper range of temperature is limited mainly by the boiling point of chloroprene, temperatures should be kept in the range from 0–50° C.

Since any of the higher chlorinated compounds produced by chlorinating chloroprene are readily separable from dichloroethane by distillation, the quantity of chlorine employed may vary over rather wide limits. While chlorination of chloroprene may result in the production of trichlorobutenes or tetra- and pentachlorobutanes, the trichlorobutenes are probably the predominant product under the conditions of the invention. The minimum quantity of chlorine required, therefore, is that which is equivalent to the stoichiometric quantity necessary to convert all the chloroprene present in the dichloroethane stream to trichlorobutene. If desired, however, sufficient chlorine may be employed to convert all the chloroprene to pentachlorobutane. An excess of chlorine of about 50% over the minimum is advantageous since it assures that sufficient chlorine for complete reaction will generally be present and the unreacted chlorine may be simply recovered and returned to the reactor for re-use.

The invention is applicable to either or both of the isomers of dichloroethane or to any mixtures of the isomers.

What is claimed is:

1. In a process for the purification of dichloroethane containing chloroprene as an impurity, the step which comprises subjecting said dichloroethane to chlorination by bubbling chlorine gas therethrough, at a temperature below 50° C., whereby the chloroprene present is selectively chlorinated to higher chlorinated compounds and separating dichloroethane therefrom by fractional distillation.

2. In a process for the purification of dichloroethane containing chloroprene as an impurity, the step which comprises subjecting said dichloroethane to chlorination by bubbling chlorine gas therethrough, at room temperature and without additional heating, whereby the chloroprene present is selectively chlorinated to higher chlorinated compounds and separating dichloroethane therefrom by fractional distillation.

3. In a process for the purification of 1,2-dichloroethane containing chloroprene as an impurity, the step which comprises subjecting said 1,2-dichloroethane to chlorination by bubbling chlorine gas therethrough, at room temperature and without additional heating, whereby the chloroprene present is selectively chlorinated to higher chlorinated compounds and separating 1,2-dichloroethane therefrom by fractional distillation.

4. In a process for the purification of 1,1-dichloroethane containing chloroprene as an impurity, the step which comprises subjecting said 1,1-dichloroethane to chlorination by bubbling chlorine gas therethrough, at room temperature and without additional heating, whereby the chloroprene present is selectively chlorinated to higher chlorinated compounds and separating 1,1-dichloroethane therefrom by fractional distillation.

References Cited in the file of this patent

UNITED STATES PATENTS

| | | |
|---|---|---|
| 2,183,046 | Reilly | Dec. 12, 1939 |
| 2,286,379 | Robinson | July 16, 1942 |
| 2,356,785 | Hammond | Aug. 29, 1944 |

FOREIGN PATENTS

| | | |
|---|---|---|
| 591,358 | Great Britain | Aug. 15, 1947 |

OTHER REFERENCES

Groggins: "Unit Processes in Organic Synthesis," third edition, pages 184-5 (1947).